(12) United States Patent
Cyranka et al.

(10) Patent No.: US 9,319,889 B2
(45) Date of Patent: Apr. 19, 2016

(54) TRANSMISSION AND RECEPTION OF A WIDEBAND SIGNAL WITH NARROWBAND INTERFERENCE

(71) Applicant: Nokia Solutions and Networks Oy, Espoo (FI)

(72) Inventors: Oliver Cyranka, Munich (DE); Martin Goldberg, Greifenberg (DE); Helmut Heinz, Turkheim (DE); Rupert Herzog, Bad Aibling (DE); Thomas Hindelang, Furstenfeldbruck (DE); Sabine Roessel, Munich (DE); Wolfgang Zirwas, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/246,321

(22) Filed: Apr. 7, 2014

(65) Prior Publication Data

US 2014/0313995 A1    Oct. 23, 2014

Related U.S. Application Data

(62) Division of application No. 13/063,841, filed as application No. PCT/EP2009/061893 on Sep. 15, 2009, now Pat. No. 8,787,142.

(30) Foreign Application Priority Data

Sep. 15, 2008  (EP) .................................... 08164354

(51) Int. Cl.
  *H04W 16/14* (2009.01)
  *H04J 11/00* (2006.01)

(52) U.S. Cl.
  CPC .............. *H04W 16/14* (2013.01); *H04J 11/004* (2013.01); *H04J 11/0033* (2013.01)

(58) Field of Classification Search
  None
  See application file for complete search history.

(56) References Cited

U.S. PATENT DOCUMENTS

| 8,238,495 | B2  |   | 8/2012 | Berens et al.        |
|-----------|-----|---|--------|----------------------|
| 2006/0176965 | A1 |   | 8/2006 | Furman et al.        |
| 2007/0060058 | A1 |   | 3/2007 | Shattil              |
| 2007/0183547 | A1 |   | 8/2007 | Fifield et al.       |
| 2009/0180403 | A1 | * | 7/2009 | Tudosoiu ........ 370/278 |
| 2010/0085913 | A1 |   | 4/2010 | Subrahmanya          |
| 2010/0226356 | A1 |   | 9/2010 | Sahin et al.         |

FOREIGN PATENT DOCUMENTS

| EP | 1 217 733 A1 | 6/2002 |
|----|--------------|--------|
| EP | 1 798 924 A1 | 6/2007 |

(Continued)

OTHER PUBLICATIONS

R1-082438, 3GPP TSG RAN WG1 #53bis, "Efficient Utilization of Unused PUCCH RB" LG Electronics Inc., Warsaw, Poland, Jun. 30-Jul. 4, 2008, 3 pgs.

(Continued)

*Primary Examiner* — Donald Mills
(74) *Attorney, Agent, or Firm* — Harrington & Smith

(57) ABSTRACT

It is disclosed a method comprising accommodating, in frequency domain, a first bandwidth of a first carrier signal with respect to a second bandwidth of a second carrier signal such that the first bandwidth adjoins to or overlaps the second bandwidth, the first bandwidth being greater than the second bandwidth.

20 Claims, 10 Drawing Sheets

(56) References Cited

FOREIGN PATENT DOCUMENTS

| EP | 1959625 A1 | 8/2008 |
|----|-----------|--------|
| WO | WO 95/20277 | 7/1995 |
| WO | WO 99/38270 | 7/1999 |
| WO | WO 2008/088254 A1 | 7/2008 |

OTHER PUBLICATIONS

Zhang, D., et al., "A novel narrowband interference canceller for OFDM systems", 2004, pp. 1426-1430.

* cited by examiner

FIG 9A

| Potential GSM carriers | NB embedding regions | LTE (1/2) RB limits | Downlink 10 MHz; 11 CCEs | | | | | | | | | | Representative Uplink OFDM Symbol |
|---|---|---|---|---|---|---|---|---|---|---|---|---|---|
| | | | PDCCH | PDCCH | | | | | | | | | PUSCH |
| | | | PCFICH | PDCCH | | | | | | | | | PUSCH |
| | | | PHICH | DUMMY | | | | | | | | | PUSCH |
| | | | PHICH | DUMMY | | | | | | | | | PUSCH |
| | | | PHICH | PDCCH | | | | | | | | | PRACH |
| | | | PHICH | PDCCH | | | | | | | | | PRACH |
| | | | PHICH | DUMMY | | | | | | | | | PRACH |
| | | | PHICH | DUMMY | | | | | | | | | PRACH |
| | | | PHICH | PDCCH | | | | | | | | | PRACH |
| | | | PHICH | PDCCH | | | | | | | | | PRACH |
| | | | PHICH | DUMMY | | | | | | | | | PRACH |
| | | | PHICH | DUMMY | | | | | | | | | PRACH |
| | | | PHICH | DUMMY | | | | | | | | | PRACH |
| | | | PHICH | PDCCH | | | | | | | | | PRACH |
| | | | PHICH | PDCCH | | | | | | | | | PRACH |
| | 1) | | DUMMY | DUMMY | | | | | | | | | PRACH |
| 9) | 3000 7) | 3060 | DUMMY | PDCCH | | | | | | | | | PUSCH etc. |
| 9) | 7) | | PDCCH | DUMMY4 | | | | | | | | | PUSCH etc. |
| 9) | 6) | 2880 | DUMMY | DUMMY | | | | | | | | | PUSCH etc. |
| 9) | 8) | | PDCCH | PDCCH4 | | | | | | | | | PUSCH etc. |
| 9) | 7) | 2700 | PDCCH | DUMMY | | | | | | | | | PUSCH etc. |
| 9) | 6) | | DUMMY | DUMMY | | | | | | | | | PUSCH etc. |
| 9) | 8) | 2520 | PDCCH | PDCCH | | | | | | | | | PUSCH etc. |
| 9) | 7) | | DUMMY | DUMMY4 | | | | | | | | | PUSCH etc. |
| 9) | 7) | 2340 | DUMMY | DUMMY4 | | | | | | | | | PUSCH etc. |
| 9) | 8) | | PDCCH | PDCCH | | | | | | | | | PUSCH etc. |
| 9) | 2) | 2160 | PCFICH | DUMMY | | | | | | | | | PUSCH etc. |
| 9) | 2000 7) | | DUMMY | PDCCH4 | | | | | | | | | PUSCH etc. |
| 9) | 8) | 1980 | PDCCH | PDCCH | | | | | | | | | PUSCH etc. |
| 9) | 4) | | DUMMY | DUMMY4 | | | | | | | | | PUSCH etc. |
| 9) | 4) | 1800 | DUMMY | PDCCH | | | | | | | | | PUSCH etc. |
| 9) | 4) | | PDCCH | DUMMY4 | | | | | | | | | PUSCH etc. |
| 9) | 1600 8) | 1620 | DUMMY | DUMMY | | | | | | | | | PUSCH etc. |
| 10) | (1500) 1) | | PDCCH | DUMMY | | | | | | | | | PUSCH etc. |
| 11) | 1400 2) | 1440 | PDCCH | PHICH | | | | | | | | | PUSCH etc. |
| 11) | 2) | | DUMMY | PHICH | | | | | | | | | PUSCH etc. |
| 11) | 2) | 1260 | DUMMY | PHICH | | | | | | | | | PUSCH etc. |
| 11) | 2) | | DUMMY | PHICH | | | | | | | | | PUSCH etc. |
| 11) | 2) | 1080 | DUMMY | PHICH | | | | | | | | | PUSCH etc. |
| 11) | 2) | | PDCCH | PHICH | | | | | | | | | PUSCH etc. |
| 11) | 2) | 900 | PDCCH | PHICH | | | | | | | | | PUSCH etc. |
| 11) | 2) | | PDCCH | PHICH | | | | | | | | | PUSCH etc. |
| 11) | 2) | 720 | DUMMY | PHICH | | | | | | | | | PUSCH etc. |
| 11) | 600 6) | | DUMMY | DUMMY | | | | | | | | | PUSCH etc. |
| | 1) | 540 | PDCCH | PDCCH | | S-Syn | P-Syn | PBCH | PBCH | PBCH | PBCH | | PUSCH etc. |
| | 1) | | DUMMY | PDCCH | | S-Syn | P-Syn | PBCH | PBCH | PBCH | PBCH | | PUSCH etc. |
| | 1) | 360 | DUMMY | DUMMY | | S-Syn | P-Syn | PBCH | PBCH | PBCH | PBCH | | PUSCH etc. |
| | 1) | | PDCCH | PDCCH | | S-Syn | P-Syn | PBCH | PBCH | PBCH | PBCH | | PUSCH etc. |
| | 1) | 180 | DUMMY | DUMMY | | S-Syn | P-Syn | PBCH | PBCH | PBCH | PBCH | | PUSCH etc. |
| | 1) | | DUMMY | DUMMY | | S-Syn | P-Syn | PBCH | PBCH | PBCH | PBCH | | PUSCH etc. |
| | 1) | | PDCCH | PDCCH | | S-Syn | P-Syn | PBCH | PBCH | PBCH | PBCH | | PUSCH etc. |
| | 1) | | PCFICH | DUMMY | | S-Syn | P-Syn | PBCH | PBCH | PBCH | PBCH | | PUSCH etc. |
| | 1) | | DUMMY | DUMMY | | S-Syn | P-Syn | PBCH | PBCH | PBCH | PBCH | | PUSCH etc. |
| | 1) | | PDCCH | PDCCH | | S-Syn | P-Syn | PBCH | PBCH | PBCH | PBCH | | PUSCH etc. |
| | 1) | | DUMMY | DUMMY | | S-Syn | P-Syn | PBCH | PBCH | PBCH | PBCH | | PUSCH etc. |
| | 1) | 540 | PDCCH | DUMMY | | S-Syn | P-Syn | PBCH | PBCH | PBCH | PBCH | | PUSCH etc. |

FIG 9B

| | | | | | | | | | | | | | | | | |
|---|---|---|---|---|---|---|---|---|---|---|---|---|---|---|---|---|
| 9) | 600 | 5) | | PDCCH | PDCCH | | | | | | | | | | | PUSCH etc. |
| 9) | | 4) | 720 | DUMMY | DUMMY | | | | | | | | | | | PUSCH etc. |
| 9) | | 5) | | PDCCH | PDCCH | | | | | | | | | | | PUSCH etc. |
| 9) | | 4) | 900 | DUMMY | DUMMY4 | | | | | | | | | | | PUSCH etc. |
| 9) | | 4) | | DUMMY | DUMMY4 | | | | | | | | | | | PUSCH etc. |
| 9) | | 5) | 1080 | PDCCH | PDCCH | | | | | | | | | | | PUSCH etc. |
| 9) | | 8) | | DUMMY | DUMMY | | | | | | | | | | | PUSCH etc. |
| 9) | | 4) | 1260 | DUMMY | PDCCH4 | | | | | | | | | | | PUSCH etc. |
| 9) | | 5) | | PDCCH | PDCCH | | | | | | | | | | | PUSCH etc. |
| 9) | 1400 | 4) | 1440 | DUMMY | DUMMY | | | | | | | | | | | PUSCH etc. |
| 10) | (1500) | 4) | | DUMMY | PDCCH | | | | | | | | | | | PUSCH etc. |
| 11) | | 2) | 1620 | PDCCH | DUMMY | PHICH | | | | | | | | | | PUSCH etc. |
| 11) | | 2) | | PDCCH | DUMMY | PHICH | | | | | | | | | | PUSCH etc. |
| 11) | | 2) | 1800 | PDCCH | PDCCH | PHICH | | | | | | | | | | PUSCH etc. |
| 11) | | 2) | | DUMMY | PDCCH | PHICH | | | | | | | | | | PUSCH etc. |
| 11) | | 2) | 1980 | DUMMY | DUMMY | PHICH | | | | | | | | | | PUSCH etc. |
| 11) | | 2) | | PDCCH | PDCCH | PHICH | | | | | | | | | | PUSCH etc. |
| 11) | | 2) | 2160 | PCFICH | DUMMY | | | | | | | | | | | PUSCH etc. |
| 11) | 2200 | 7) | | DUMMY | PDCCH4 | | | | | | | | | | | PUSCH etc. |
| 11) | | 8) | 2340 | PDCCH | PDCCH | | | | | | | | | | | PUSCH etc. |
| 11) | | 7) | | DUMMY | DUMMY4 | | | | | | | | | | | PUSCH etc. |
| 11) | | 8) | 2520 | DUMMY | PDCCH | | | | | | | | | | | PUSCH etc. |
| 11) | | 7) | | PDCCH | DUMMY4 | | | | | | | | | | | PUSCH etc. |
| 11) | 2600 | 6) | 2700 | DUMMY | DUMMY | | | | | | | | | | | PUSCH etc. |
| 10) | (2700) | 8) | 2790 | PDCCH | PDCCH4 | | | | | | | | | | | PUSCH etc. |
| | | 1) | | PDCCH | DUMMY | | | | | | | | | | | PRACH |
| | | 1) | | DUMMY | DUMMY | | | | | | | | | | | PRACH |
| | | 1) | | PDCCH | PDCCH | | | | | | | | | | | PRACH |
| | | 1) | | DUMMY | DUMMY4 | | | | | | | | | | | PRACH |
| | | 1) | | DUMMY | DUMMY4 | | | | | | | | | | | PRACH |
| | | 1) | | PDCCH | PDCCH | | | | | | | | | | | PRACH |
| | | 1) | | DUMMY | DUMMY | | | | | | | | | | | PRACH |
| | | 1) | | DUMMY | PDCCH4 | | | | | | | | | | | PRACH |
| | | 1) | | PDCCH | PDCCH4 | | | | | | | | | | | PRACH |
| | | 1) | | DUMMY | DUMMY | | | | | | | | | | | PRACH |
| | | 1) | | DUMMY | PDCCH | | | | | | | | | | | PRACH |
| | | 1) | | PDCCH | DUMMY4 | | | | | | | | | | | PRACH |
| | | 1) | | DUMMY | DUMMY | | | | | | | | | | | PRACH |
| | | 1) | | PDCCH | PDCCH4 | | | | | | | | | | | PRACH |
| | | 1) | | PDCCH | DUMMY | | | | | | | | | | | PRACH |
| | | 1) | | DUMMY | PDCCH4 | | | | | | | | | | | PRACH |

| Legend | |
|---|---|
| 1) | Prohibitetd for NB embedding |
| 2) | Could be freed in other configurations |
| 3) | Available for NB embedding |
| 4) | Available for NB embedding |
| 5) | PDCCH optimization for NB embedding |
| 6) | Available for NB embedding but may be lost in other configs |
| 7) | Available for NB embedding but may be lost in other configs |
| 8) | PDCCH optimization for NB embedding but may be lost in other configs |
| 9) | 200 kHz GSM carrier allocation region |
| 10) | (Alternative GSM-carrier-2-LTE-carrier pos) |
| 11) | Potential via other configurations |

US 9,319,889 B2

TRANSMISSION AND RECEPTION OF A WIDEBAND SIGNAL WITH NARROWBAND INTERFERENCE

CROSS-REFERENCE TO A RELATED PATENT APPLICATION

This application is a Divisional of U.S. patent application Ser. No. 13/063,841, filed May 23, 2011, which claims priority to International Patent Application No. PCT/EP2009/061893, filed on Sep. 15, 2009, and to EP application No. 08164354.6, filed on Sep. 15, 2008, for which the above-identified International Application claims priority.

FIELD OF THE INVENTION

The present invention relates to signal transmission and reception. More specifically, the present invention relates to methods, apparatuses, a system and a related computer program product for signal transmission and receptions. Examples of the present invention may be applicable e.g. to cellular systems such as 3GPP ($3^{rd}$ generation partnership project) LTE (long term evolution).

BACKGROUND

Currently, extensions to the LTE Release 8 standard are discussed for future releases, like LTE Release 9 or IMT (international mobile telephony) advanced/LTE-Advanced, e.g. in order to increase system performance.

At the same time, there may be different application scenarios for LTE systems in different frequency bands. Specifically, the tight cooperation of LTE with GSM (global system for mobile communications) transmissions may be considered as such a cooperation allows for providing full coverage GSM systems in combination with high performance LTE radio air interfaces.

For example, as the minimum LTE bandwidth may be 1.4 MHz in a system, it will be difficult to accommodate e.g. an additional GSM carrier of 200 KHz bandwidth in this same frequency band of 1.6 MHz, as there will be strong frequency guard bands required to avoid inter system interference.

However, if a GSM carrier and an LTE carrier are used in close-by frequency bands or even in the same frequency band, there may be strong interference due to mutual out-of-band emissions. As GSM has a much smaller bandwidth of only 200 KHz compared to e.g. 10 or 20 MHz for LTE, the main interference may stem from GSM to the LTE system under the assumption that both carriers have substantially the same overall transmit power.

In consideration of the above, it is an object of examples of the present invention to overcome one or more of the above drawbacks. In particular, the present invention provides methods, apparatuses, a system and a related computer program product for signal transmission and reception.

According to an example of the present invention, in a first aspect, this object is for example achieved by a method comprising:

accommodating, in frequency domain, a first bandwidth of a first carrier signal with respect to a second bandwidth of a second carrier signal such that the first bandwidth adjoins to or overlaps the second bandwidth, the first bandwidth being greater than the second bandwidth.

According to further refinements of the example of the present invention as defined under the above first aspect, the method further comprises transmitting the first and second signals from a single means for transmitting;

the method further comprises transmitting the first and second signals from a plurality of means for transmitting in a coordinated manner.

According to an example of the present invention, in a second aspect, this object is for example achieved by a method comprising:

transmitting a transmission signal comprising a plurality of subcarrier signals of a first carrier signal, each of which subcarrier signals being subtracted by an effective interference of a modulated second carrier signal.

According to further refinements of the example of the present invention as defined under the above second aspect, the method further comprises, prior to the transmitting, subtracting the effective interference of the modulated second carrier signal from each of the plurality of subcarrier signals of the first carrier signal;

the method further comprises, prior to the transmitting, filtering the modulated second carrier signal for removing the subcarrier signals overlapping the modulated second carrier signal in bandwidth;

the method further comprises, after the subtracting and prior to the transmitting transforming a result signal resulting from the subtracting from frequency domain into time domain, inserting time intervals into the transformed result signal, and combining the result signal being transformed and inserted with time intervals with the filtered and modulated second carrier signal to form the transmission signal;

the method further comprises, after the filtering and prior to the subtracting, transforming the modulated first carrier signal from time domain into frequency domain;

the method further comprises, after the transforming, calculating, by filtering the transformed and modulated second carrier signal, a resulting distortion from the second carrier signal to the first carrier signal based on at least one of timing information and channel information.

According to an example of the present invention, in a third aspect, this object is for example achieved by a method comprising:

retrieving a first carrier signal from a received transmission signal comprising a plurality of subcarrier signals of the first carrier signal, each of which subcarrier signals being interfered by an effective interference of a modulated second carrier signal.

According to further refinements of the example of the present invention as defined under the above third aspect, the method further comprises, prior to the retrieving, receiving the transmission signal;

the retrieving is performed by subtracting a generated replica of the second carrier signal from the received transmission signal;

the method further comprises, prior to the subtracting, generating the replica of the second carrier signal by demodulating the decoded transmission signal, decoding the received transmission signal, and filtering the demodulated and decoded transmission signal for removing the subcarrier signals overlapping the modulated second carrier signal in bandwidth;

the retrieving further comprises, after the subtracting, transforming a signal resulting from the subtracting from time domain into frequency domain;

the method further comprises, after the receiving and prior to the retrieving, queuing (S3-1) the received transmission signal;

the retrieving is performed by decoding the received transmission signal, lltering the decoded transmission signal for removing the subcarrier signals overlapping the modulated second carrier signal in bandwidth, detecting a midamble in at least one signal burst of the second carrier signal based on a reference midamble, extracting the midamble from the current signal burst, estimating current channel information from the extracted midamble, and processing symbols sent via the first carrier signal based on the estimated current channel information during a subsequent burst of the second carrier signal after the at least one burst.

According to an example of the present invention, in a fourth aspect, this object is for example achieved by a method comprising:

distributing, in unoccupied control channel elements of a first carrier signal having a first bandwidth, at least a portion of a second carrier signal having a second bandwidth by using different control channel configurations in at least one neighboring cell, the first bandwidth being greater than the second bandwidth.

According to further refinements of the example of the present invention as defined under the above first to fourth aspects, the first carrier signal is a long term evolution carrier signal;
the second carrier signal is a global system for mobile communications carrier signal;
the transforming from time domain into frequency domain is one of a Fourier transformation and a fast Fourier transformation;
the transforming from frequency domain into time domain is one of an inverse Fourier transformation and an inverse fast Fourier transformation;
the timing information is an orthogonal frequency division multiplexing guard interval;
the channel information is channel state information;
the queuing is performed based on a first in first out queue.

According to an example of the present invention, in a fifth aspect, this object is for example achieved by an apparatus comprising:

means for accommodating, in frequency domain, a first bandwidth of a first carrier signal with respect to a second bandwidth of a second carrier signal, the first bandwidth adjoining to or overlapping the second bandwidth, and the first bandwidth being greater than the second bandwidth.

According to further refinements of the example of the present invention as defined under the above fifth aspect, the apparatus further comprises a single means for transmitting the first and second signals;
the apparatus further comprises a plurality of means for transmitting the first and second signals in a coordinated manner;
the or each means for transmitting is constituted by a radio frequency, power amplifier and antenna chain.

According to an example of the present invention, in a sixth aspect, this object is for example achieved by an apparatus comprising:

means for transmitting a transmission signal comprising a plurality of subcarrier signals of a first carrier signal, each of which subcarrier signals being subtracted by an effective interference of a modulated second carrier signal.

According to further refinements of the example of the present invention as defined under the above sixth aspect, the apparatus further comprises means for subtracting, prior to the transmitting performed by the means for transmitting, the effective interference of the modulated second carrier signal from each of the plurality of subcarrier signals of the first carrier signal;

the apparatus further comprises means for filtering, prior to the transmitting performed by the means for transmitting, the modulated second carrier signal for removing the subcarrier signals overlapping the modulated second carrier signal in bandwidth;
the apparatus further comprises means for transforming, after the subtracting performed by the means for subtracting and prior to the transmitting performed by the means for transmitting, a result signal resulting from the subtracting from frequency domain into time domain, means for inserting, after the subtracting performed by the means for subtracting and prior to the transmitting performed by the means for transmitting, time intervals into the transformed result signal, and means for combining, after the subtracting performed by the means for subtracting and prior to the transmitting performed by the means for transmitting, the result signal being transformed and inserted with time intervals with the filtered and modulated second carrier signal to form the transmission signal;
the apparatus further comprises means for transforming, after the filtering performed by the means for filtering and prior to the subtracting performed by the means for subtracting, the modulated first carrier signal from time domain into frequency domain;
the apparatus further comprises means for calculating, after the transforming performed by the means for transforming and by filtering the transformed and modulated second carrier signal, a resulting distortion from the second carrier signal to the first carrier signal based on at least one of timing information and channel information.

According to an example of the present invention, in a seventh aspect, this object is for example achieved by an apparatus comprising:

means for retrieving a first carrier signal from a received transmission signal comprising a plurality of subcarrier signals of the first carrier signal, each of which subcarrier signals being interfered by an effective interference of a modulated second carrier signal.

According to further refinements of the example of the present invention as defined under the above seventh aspect, the apparatus further comprises means for receiving the transmission signal prior to the retrieving performed by the means for retrieving;
the means for retrieving further comprises means for subtracting a generated replica of the second carrier signal from the received transmission signal;
the apparatus further comprises means for generating, prior to the subtracting performed by the means for subtracting, the replica of the second carrier signal, the means for generating comprising means for demodulating the decoded transmission signal, means for decoding the received transmission signal, and means for filtering the demodulated and decoded transmission signal for removing the subcarrier signals overlapping the modulated second carrier signal in bandwidth;
the means for retrieving further comprises means for transforming, after the subtracting performed by the means for subtracting, a signal output by the means for subtracting from time domain into frequency domain;
the apparatus further comprises means for queuing the received transmission signal after the receiving performed by the means for receiving and prior to the retrieving performed by the means for retrieving;
the means for retrieving comprises means for decoding the received transmission signal, means for filtering the decoded transmission signal for removing the subcarrier signals overlapping the modulated second carrier signal in bandwidth, means for detecting a midamble in at least one signal burst of the second carrier signal based on a reference midamble, means for extracting the midamble from the current signal burst, means for estimating current channel information from the extracted midamble, and means for processing symbols sent via the first carrier signal based on the estimated current channel information during a subsequent burst of the second carrier signal after the at least one burst.

According to an example of the present invention, in an eighth aspect, this object is for example achieved by an apparatus comprising:

means for distributing, in unoccupied control channel elements of a first carrier signal having a first bandwidth, at least a portion of a second carrier signal having a second bandwidth by using different control channel configurations in at least one neighboring cell, the first bandwidth being greater than the second bandwidth.

According to further refinements of the example of the present invention as defined under the above fifth to eighth aspects, the first carrier signal is a long term evolution carrier signal;
the second carrier signal is a global system for mobile communications carrier signal;
the transforming from time domain into frequency domain is one of a Fourier transformation and a fast Fourier transformation;
the transforming from frequency domain into time domain is one of an inverse Fourier transformation and an inverse fast Fourier transformation;
the timing information is an orthogonal frequency division multiplexing guard interval;
the channel information is channel state information;
the means for queuing is configured to queue based on a first in first out queue;
at least one, or more of means for accommodating, means for transmitting, means for subtracting, means for filtering, means for calculating, means for combining, means for transforming, means for inserting, means for retrieving, means for receiving, means for generating, means for queuing, means for modulating, means for demodulating, means for decoding, means for detecting, means for extracting, means for estimating, means for processing, means for distributing and the apparatus is implemented as a chipset or module.

According to an example of the present invention, in a ninth aspect, this object is for example achieved by a system comprising:

a transmission apparatus according to the above sixth aspect;
an accommodating apparatus according to the above fifth aspect;
a receiving apparatus according to the above seventh aspect; and
a distributing apparatus according to the above eighth aspect.

According to an example of the present invention, in a tenth aspect, this object is for example achieved by a computer program product comprising code means for performing method steps of a method according to any one of the above first to fourth aspects, when run on a processing means or module.

In this connection, it has to be pointed out that examples of the present invention enable one or more of the following:

Alleviating a need for separation of the LTE spectrum into two or more different LTE carriers;
Alleviating a need for insertion of rather large (frequency) guard bands to separate LTE and GSM systems from each other;
Enhancing overall spectral efficiency of the system concept;
Complying with a legacy GSM receiver, since the interference due to the LTE signal is mainly blocked due to according receiver filters, and since the residual LTE out of band interference is very small;
Providing full GSM coverage;
Effectively combining LTE and GSM signals, such that specifically GSM might be included into the LTE signal at an arbitrary place of the spectrum, e.g. at suitable positions for reducing the interference on control channels.
Allowing support of UEs (user equipments) by pre-coding, which UEs are not aware of the combined LTE-GSM transmission. This may be facilitated by CSI (channel state information) that may be available;
Enabling interference cancellation in the UEs e.g. by implementing a GSM decoder. Additionally, corresponding control signals and messages are defined e.g. for broadcasting of the location of the GSM carrier.

BRIEF DESCRIPTION OF THE DRAWINGS

Examples of the present invention are described herein below with reference to the accompanying drawings, in which:

FIG. 9A and FIG. 9B show an alternative method and apparatus according to an example of the present invention using e.g. prohibited and available narrowband embedding regions aligned with respect to DL (uplink) and DL (downlink).

DETAILED DESCRIPTION OF THE PRESENT INVENTION

Examples of the present invention are described herein below by way of example with reference to the accompanying drawings.

It is to be noted that for this description, the terms "long term evolution carrier signal; global system for mobile communications carrier signal; (fast) Fourier transformation; inverse (fast) Fourier transformation; orthogonal frequency division multiplexing guard interval; channel state information; and first in first out queue" are examples for "first carrier signal; second carrier signal; transforming from time domain into frequency domain; transforming from frequency domain into time domain; timing information; the channel information; and queuing", respectively, without restricting the latter-named terms to the special technical or implementation details imposed to the first-named terms.

Figure 1:
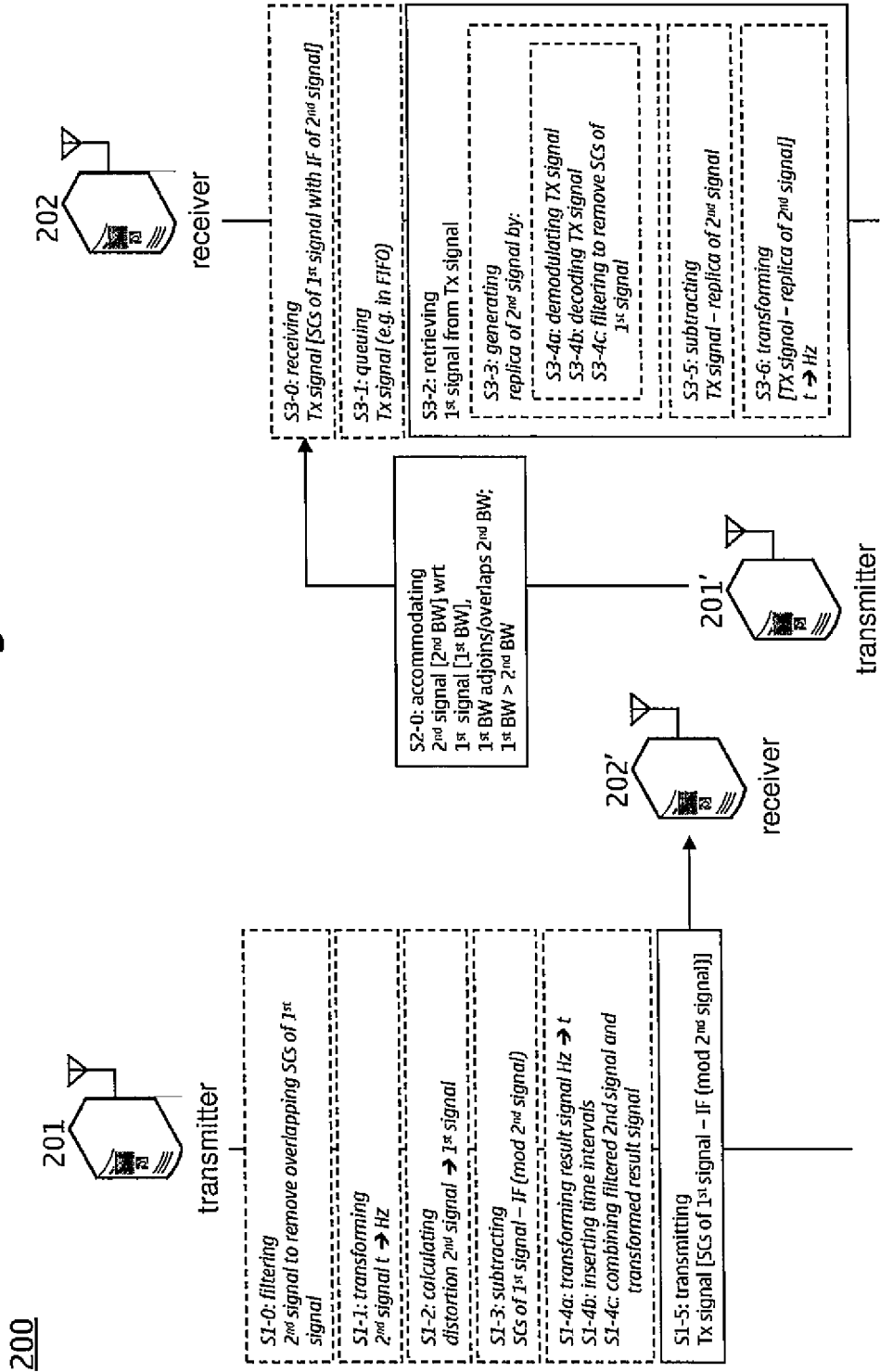
FIG. 1 shows methods according to an example of the present invention for signal transmission and reception.
Figure 2:
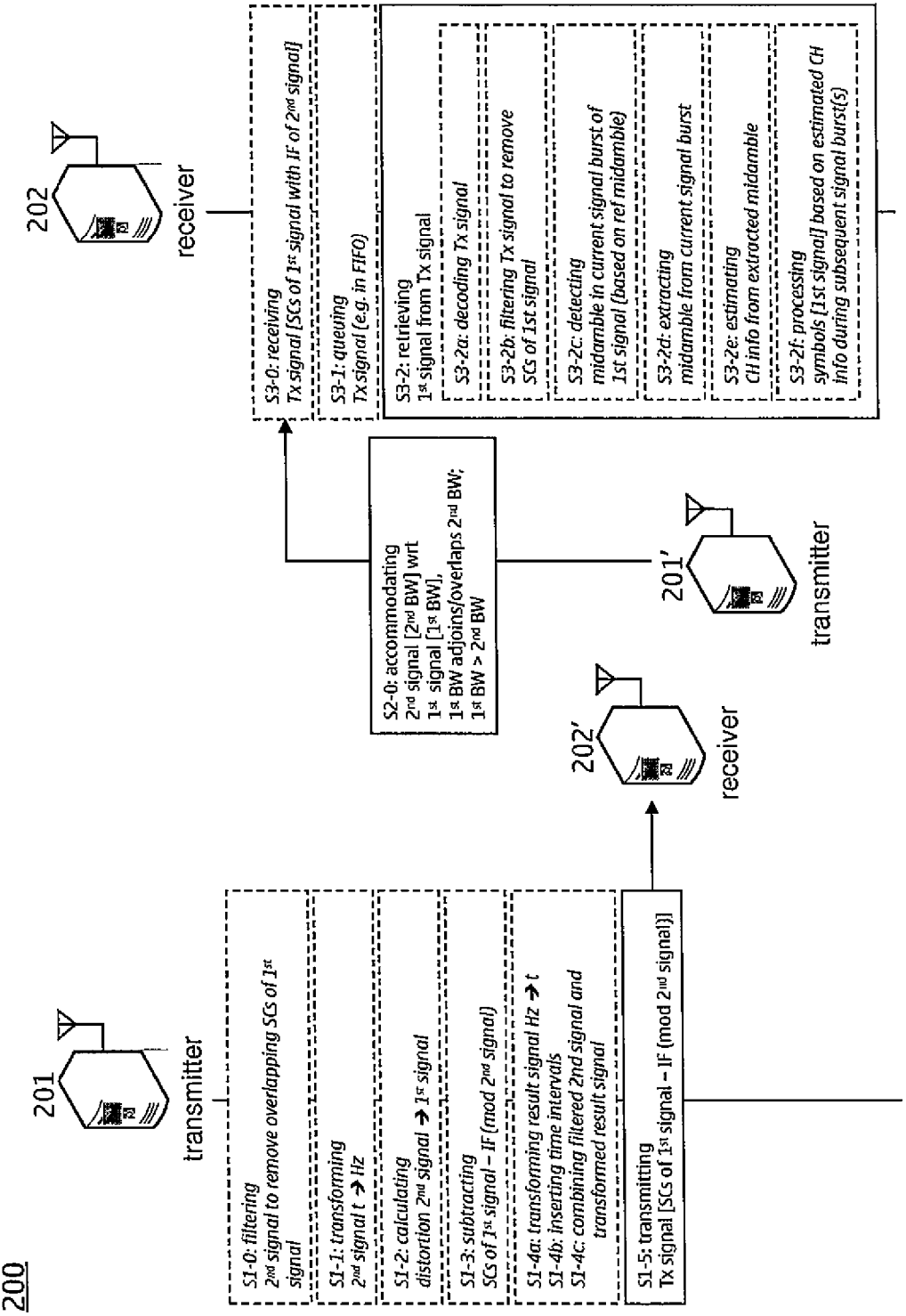
FIG. 2 shows an alternative method according to an example of the present invention for signal transmission and reception.

FIGS. 1 and 2 show methods for signal transmission and reception according to an example of the present invention. Signaling between elements is indicated in horizontal direction, while time aspects between signaling may be reflected in the vertical arrangement of the signaling sequence as well as in the sequence numbers. It is to be noted that the time aspects indicated in FIGS. 1 and 2 do not necessarily restrict any one of the method steps shown to the step sequence outlined. This applies in particular to method steps that are functionally disjunctive with each other. Within FIGS. 1 and 2, for ease of description, means or portions which may provide main functionalities are depicted with solid functional blocks or arrows and/or a normal font, while means or portions which may provide optional functions are depicted with dashed functional blocks or arrows and/or an italic font.

As shown in FIGS. 1 and 2, a communication system 200 may comprise a transmitter 201 according to an example of the present invention (such as a BS (base station)), a receiver 202 (such as a UE) according to an example of the present invention, a transmitter 201' (see also FIG. 6) and a receiver 202'.

In an optional step S1-0, e.g. the transmitter 201 filtering a modulated second carrier signal for removing subcarrier signals overlapping the modulated second carrier signal in bandwidth.

In an optional step S1-1, e.g. the transmitter 201 may perform transforming the modulated first carrier signal from time domain into frequency domain (e.g. by a (F)FT).

In a further optional step S1-2, e.g. the transmitter 201 may perform calculating, e.g. by filtering the transformed and modulated second carrier signal, a resulting distortion from the second carrier signal to the first carrier signal based on at least one of timing information (e.g. OFDM GI) and channel information (e.g. CSI).

In an optional step S1-3, e.g. the transmitter 201 may perform subtracting the effective interference of the modulated second carrier signal from each of the plurality of subcarrier signals of the first carrier signal.

Then, in optional steps S1-4a to S1-4c, e.g. the transmitter 201 may perform transforming a result signal resulting from the subtracting from frequency domain into time domain (IFFT), inserting time intervals into the transformed result signal; and combining the result signal being transformed and inserted with time intervals with the filtered and modulated second carrier signal to form the transmission signal.

In step S1-5, e.g. the transmitter 201 may perform transmitting the transmission signal comprising a plurality of the subcarrier signals of the first carrier signal (LTE), each of which subcarrier signals being subtracted by the effective interference of the modulated second carrier signal (GMSK).

Alternatively, in step S2-0, e.g. an accommodator (or means for accommodating) 203 shown in FIG. 3 (described in more detail hereinbelow) may perform accommodating (S2-0), in frequency domain, a first bandwidth of a first carrier signal (LTE carrier) with respect to a second bandwidth of a second carrier signal (GSM carrier) such that the first bandwidth adjoins to or overlaps the second bandwidth, the first bandwidth being greater than the second bandwidth.

E.g. in case the transmission signal from the transmitter 201' has a form given by the accommodator, in an optional step S3-0, e.g. the receiver 202 may perform receiving a transmission signal comprising a plurality of subcarrier signals of the first carrier signal, each of which subcarrier signals being interfered by an effective interference of a modulated second carrier signal (GMSK).

Then, in an optional step S3-1, e.g. the receiver 202 may perform queuing the received transmission signal.

Thus, in step S3-2, e.g. the receiver 202 may perform retrieving the first carrier signal (e.g. LTE) from the received transmission signal.

Then, in an optional step S3-3, e.g. the receiver 202 may perform generating a replica of the second carrier signal. The generating performed may comprise, in optional steps S3-4a to S3-4c, demodulating (S3-4a) the received transmission signal; decoding the demodulated transmission signal, and filtering the demodulated and decoded transmission signal for removing the subcarrier signals overlapping the modulated second carrier signal in bandwidth.

Then, in an optional step S3-5, e.g. the receiver 202 may perform subtracting the generated replica of the second carrier signal from the received transmission signal.

Finally, in an optional step S3-6, e.g. the receiver may perform transforming the signal resulting from the subtracting from time domain into frequency domain.

Alternatively, as shown in FIG. 2, the receiver 202 may also perform the retrieving by performing, in optional steps S3-2a to S3-2f, decoding the received transmission signal, filtering the decoded transmission signal for removing the subcarrier signals overlapping the modulated second carrier signal in bandwidth, detecting a midamble in at least one signal burst of the second carrier signal based on a reference midamble, extracting the midamble from the current signal burst, estimating current channel information from the extracted midamble; and processing symbols sent via the first carrier signal based on the estimated current channel information during a subsequent burst of the second carrier signal after the at least one burst.

Finally, as shown in FIG. 9A and FIG. 9B, another example of the present invention may also cover distributing, in unoccupied control channel elements of the first carrier signal having the first bandwidth, at least a portion of the second carrier signal having the second bandwidth by using different control channel configurations in at least one neighboring cell, the first bandwidth being greater than the second bandwidth.

As for further refinements of the methods according to an example of the present invention, the first carrier signal may be a long term evolution carrier signal, and the second carrier signal may be a global system for mobile communications carrier signal. In addition, the transforming from time domain into frequency domain may be a (fast) Fourier transformation, and the transforming from frequency domain into time domain may be an inverse (fast) Fourier transformation. Still further, the timing information may an orthogonal frequency division multiplexing guard interval, and the channel information may channel state information. Moreover, the queuing may be performed based on a first in first out queue. Finally, the transmitting of the first and second signals may be from a single means for transmitting or from a plurality of means for transmitting in a coordinated manner.

FIGS. 3 to 8 show apparatuses (e.g. transmitter 201, transmitter 201', receiver 202 and accommodator 203) for signal transmission and reception according to an example and an alternative example of the present invention. Within those Figs, for ease of description, means or portions which may provide main functionalities are depicted with solid functional blocks or arrows and a normal font, while means or portions which may provide optional functions are depicted with dashed functional blocks or arrows and an italic font.

The transmitter 201 may comprise a transmitting antenna (or means for transmitting) 2011, a modulator (or means for modulating) 2012, a low-pass filter (or means for filtering) 2013, a transformer (or means for transforming) 2014, an SC filter for calculating (or means for calculating) 2015, an inverse transformer (or means for transforming) 2016, an inserter (or means for inserting) 2017, a combiner (or means for combining) 2018 and a subtractor (or means for subtracting) 2019.

The receiver 202 may comprise a retriever (or means for retrieving) 2021, a generator (or means for generating) 2022, a receiving antenna (or means for receiving) 2023, a demodulator (or means for demodulating) 2024, a modulator (or means for modulating) 2025, a low-pass filter (or means for filtering) 2026, a FIFO (or means for queuing) 2027, a subtractor (or means for subtracting) 2028 and a transformer (or means for transforming) 2029.

Optionally, e.g. the means for filtering 2013 of the transmitter 201 may perform filtering a modulated second carrier signal for removing subcarrier signals overlapping the modulated second carrier signal in bandwidth.

Also optionally, e.g. the means for transforming 2014 of the transmitter 201 may perform transforming the modulated first carrier signal from time domain into frequency domain (e.g. by a (F)FT).

Optionally, e.g. the means for calculating 2015 of the transmitter 201 may perform calculating, e.g. by filtering the transformed and modulated second carrier signal, a resulting distortion from the second carrier signal to the first carrier signal based on at least one of timing information (e.g. OFDM GI) and channel information (e.g. CSI).

Optionally, e.g. the means for subtracting 2019 of the transmitter 201 may perform subtracting the effective interference of the modulated second carrier signal from each of the plurality of subcarrier signals of the first carrier signal.

Then, e.g. the means for transforming 2016 of the transmitter 201 may perform transforming a result signal resulting from the subtracting from frequency domain into time domain (IFFT), e.g. the means for inserting 2017 of the transmitter 201 may perform inserting time intervals into the transformed result signal, and e.g. the means for combining 2018 of the transmitter 201 may perform combining the result signal being transformed and inserted with time intervals with the filtered and modulated second carrier signal to form the transmission signal.

Then, e.g. the means for transmitting 2011 of the transmitter 201 may perform transmitting the transmission signal comprising a plurality of the subcarrier signals of the first carrier signal (LTE), each of which subcarrier signals being subtracted by the effective interference of the modulated second carrier signal (GMSK).

Figure 3:
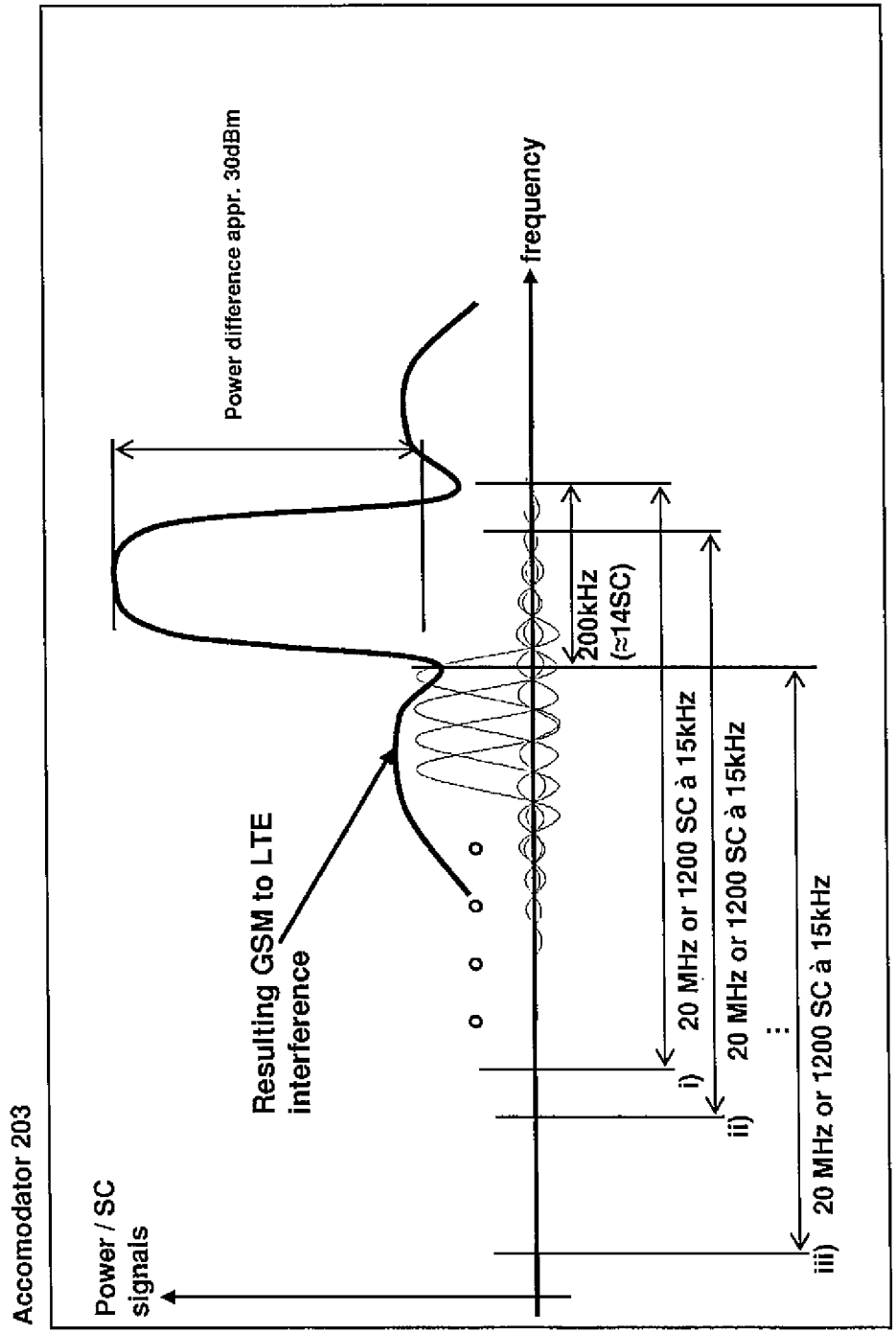
FIG. 3 shows an apparatus according to an example of the present invention for accommodating e.g. a GSM carrier signal into an LTE carrier signal using e.g. mutual interference between the GSM and LTE carriers.
Figure 6:
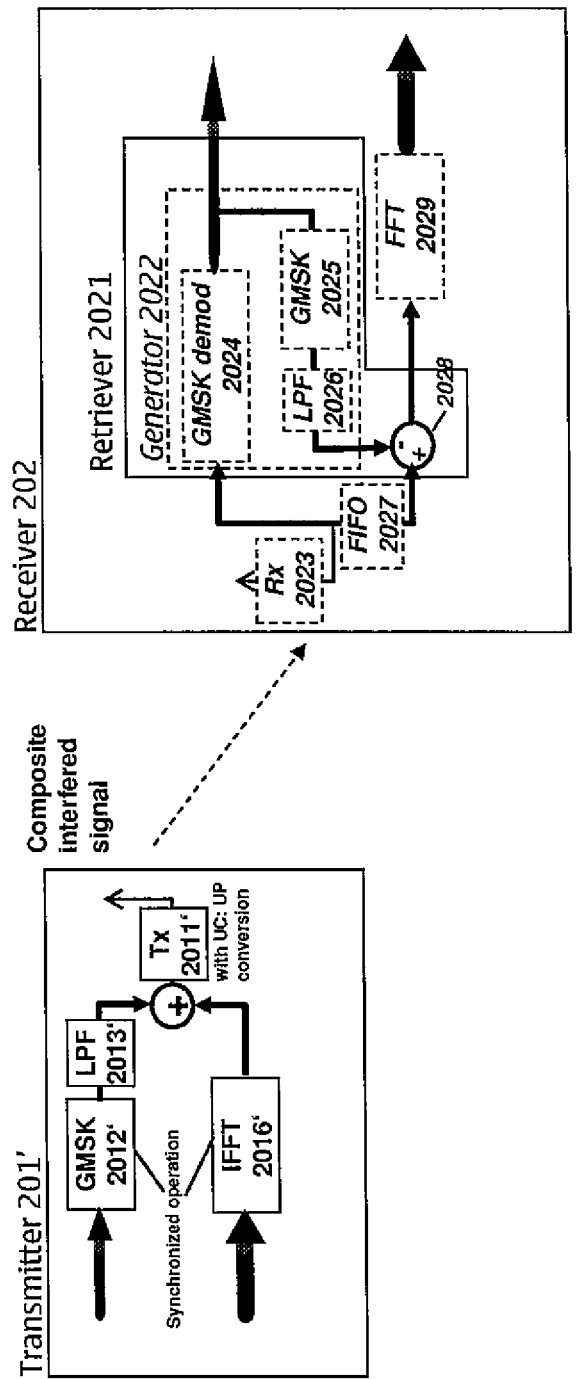
FIG. 6 shows an apparatus according to an example of the present invention for receiving and retrieving using e.g. a time domain approach for combined GSM and LTE transmission.

Alternatively, as shown in FIGS. 3 and 6, e.g. an accommodator (or means for accommodating) 203 may perform accommodating, in frequency domain, a first bandwidth of a first carrier signal (e.g. LTE carrier) with respect to a second bandwidth of a second carrier signal (e.g. GSM carrier) such that the first bandwidth adjoins to or overlaps the second bandwidth, the first bandwidth being greater than the second bandwidth. As shown in FIG. 3, in a case i), the second carrier signal (e.g. LTE signal carrier) may fully overlap the second carrier signal (e.g. GSM carrier); in a case ii), the second signal may overlap the first signal partially; and in a case iii), the second signal may adjoin to the first signal.

Optionally, e.g. in case the transmission signal from the transmitter 201' has a form given by the accommodator 203, e.g. the means for receiving 2023 of the receiver 202 may perform receiving a transmission signal comprising a plurality of subcarrier signals of the first carrier signal, each of which subcarrier signals being interfered by an effective interference of a modulated second carrier signal (GMSK).

Then optionally, e.g. the means for queuing 2027 of the receiver 202 may perform queuing the received transmission signal.

Thus, e.g. the means for retrieving 2021 of the receiver 202 may perform retrieving the first carrier signal (e.g. LTE) from the received interfered transmission signal.

Optionally, e.g. the means for generating 2022 of the means for retrieving 2022 may perform generating a replica of the second carrier signal. The means for generating 2022 may optionally comprise means for demodulating 2024 the received transmission signal, means for decoding 2025 the demodulated transmission signal, and means for filtering 2026 the demodulated and decoded transmission signal for removing the subcarrier signals overlapping the modulated second carrier signal in bandwidth.

Then, e.g. the optional means for subtracting 2028 of the means for retrieving 2021 may perform subtracting the generated replica of the second carrier signal from the received transmission signal.

Finally, e.g. the optional means for transforming 2029 of the receiver 202 may perform transforming the signal resulting from the subtracting from time domain into frequency domain.

Figure 7:
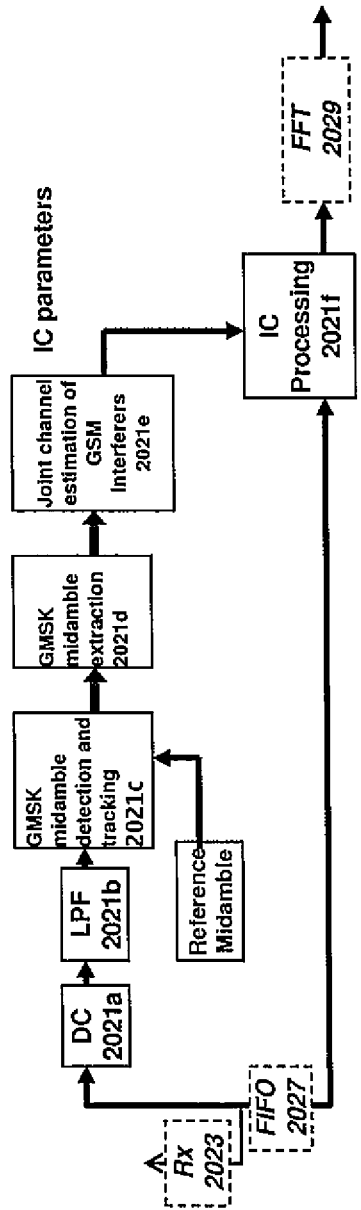
FIG. 7 shows an alternative apparatus according to an example of the present invention for receiving and retrieving using e.g. CSI based cancellation of GSM interferer(s)
Figure 8:
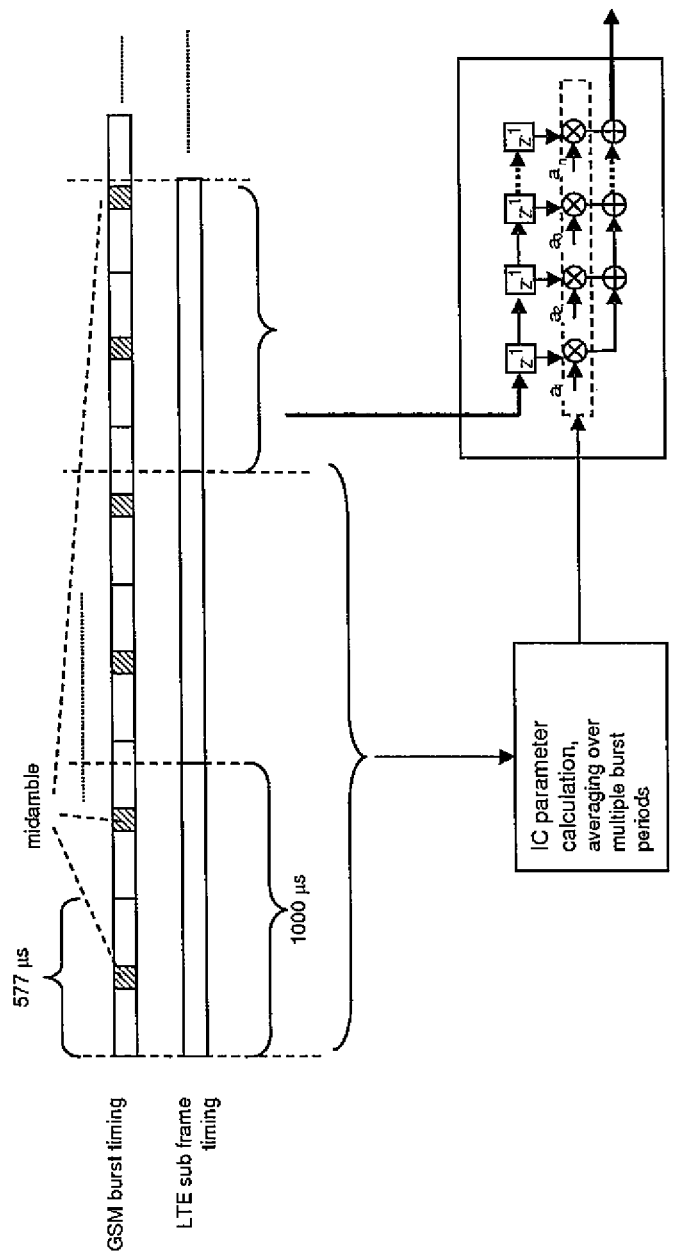
FIG. 8 shows a delay reduction according to the apparatus shown in FIG. 7.

Alternatively, as shown in FIG. 7, the means for retrieving of the receiver 202 may also comprise means for decoding 2021a the received transmission signal, means for filtering 2021b the decoded transmission signal for removing the subcarrier signals overlapping the modulated second carrier signal in bandwidth, means for detecting 2021c a midamble in at least one signal burst of the second carrier signal based on a reference midamble, means for extracting 2021d the midamble from the current signal burst, means for estimating 2021e current channel information from the extracted midamble; and means for processing 2021f symbols sent via the first carrier signal based on the estimated current channel information during a subsequent burst of the second carrier signal after the at least one burst.

Finally, as shown in FIG. 9A and FIG. 9B, another example of the present invention may also cover means for distributing, in unoccupied control channel elements of the first carrier signal having the first bandwidth, at least a portion of the second carrier signal having the second bandwidth by using different control channel configurations in at least one neighboring cell, the first bandwidth being greater than the second bandwidth.

As for further refinements of the apparatuses according to an example of the present invention, the first carrier signal may be a long term evolution carrier signal, and the second carrier signal may be a global system for mobile communications carrier signal. In addition, the transforming from time domain into frequency domain may be a (fast) Fourier transformation, and the transforming from frequency domain into time domain may be an inverse (fast) Fourier transformation. Still further, the timing information may an orthogonal frequency division multiplexing guard interval, and the channel information may channel state information. Moreover, the queuing may be performed based on a first in first out queue.

Finally, there may be a single means for transmitting or a plurality of means for transmitting in a coordinated manner.

Furthermore, at least one of, or more of means for accommodating 203, means for transmitting 2011; 2011', means for subtracting 2019, means for filtering 2013; 2026; 2021b, means for calculating 2015, means for combining 2018, means for transforming 2014; 2016, means for inserting 2017, means for retrieving 2021, means for receiving 2023, means for generating 2022, means for queuing 2027, means for modulating 2025; 2012, means for demodulating 2024, means for decoding 2021a, means for detecting 2021c, means for extracting 2021d, means for estimating 2021e, means for processing 2021f, means for distributing and/or the transmitter 201'/transmitter 201/receiver 202, or the respective functionalities carried out, may be implemented as a chipset or module.

The present invention also relates to a system which may comprise the above-described transmitter 201 (or transmitter 201' in conjunction with accommodator 203), the receiver 202 and the above-mentioned distributor.

Without being restricted to the details following in this section, the embodiment of the present invention may be summarized as follows:

The invention resides in 1. the idea of efficient Combined Transmission of two (or more) radio access technologies (RAT) in a single frequency block, i.e., a narrowband system and a wideband system, by
    maintaining a single wideband (LTE) carrier (surrounding the narrowband (GSM) carrier(s) in frequency domain), and
    Not introducing explicit (GSM-to-LTE frequency) guard bands.
    Combined Transmission may be the transmission from
    a. a single RF, power amplifier, and antenna chain, or
    b. multiple RF, power amplifier, and antenna chains in a coordinated manner.

2. A Pre-coding Solution on the transmitter side for counter-acting the interference caused by the narrowband system (GSM) into the wideband system (LTE).

3. In a delay reduction method for serial interference cancellation used on the receiver side for counter-acting the interference caused by the narrowband system (GSM) into the wideband system (LTE).

4. In distributing via network planning different LTE Release 8 control channel configurations over the network in such a way that a significant part or even a complete GSM network can be embedded into e.g. a 20 MHz carrier LTE Release 8 network.

Feasibility of Invention:
Using Combined Transmission of GSM and LTE, the performance of LTE both of the data and the control channels may be affected. Receiver interference cancellation and transmitter pre-coding intend to reduce drastically the performance degradation.

1. Combined Transmission of GSM and LTE:
The principle of Combined Transmission of a narrowband carrier and a wideband carrier is illustrated in FIG. 3 using the example of Combined Transmission of GSM and LTE Release 8.

2. Pre-Coding Solution for Combined Transmission of GSM and LTE:
One option is to apply a pre-compensation according to FIG. 4, where the effective interference from the GMSK signal to each subcarrier of the LTE signals may be pre-subtracted. For that purpose the GMSK signal is transformed from the time into the frequency domain by the same FFT (fast Fourier transformation) as may be used at the LTE receiver for the LTE signal. Those subcarriers located at the transmission of the GMSK signal are filtered out before subtraction of the interfering signals per each subcarrier of the LTE signal.

Figure 4:
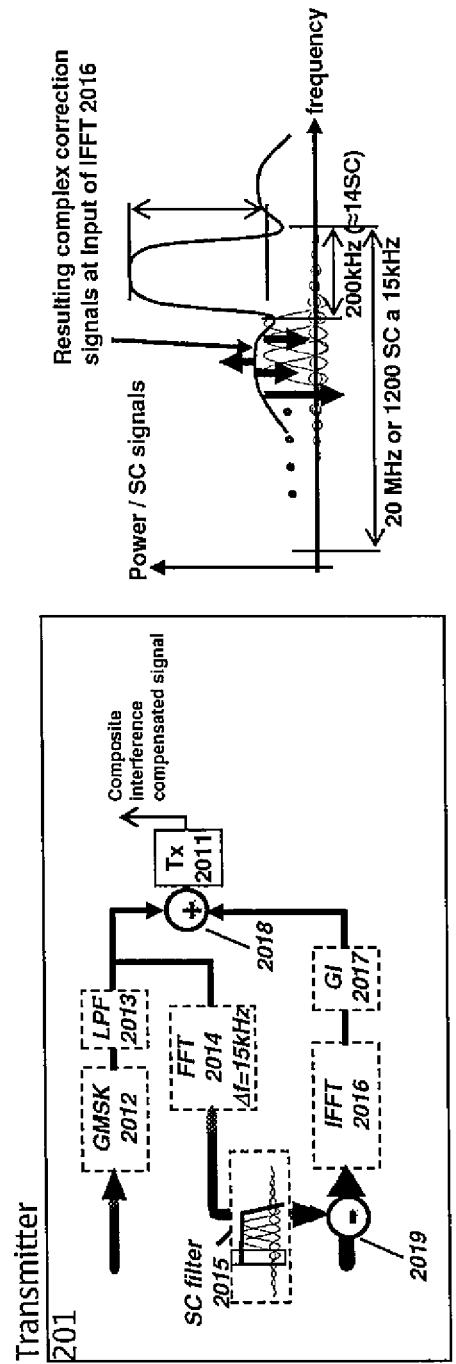
FIG. 4 shows an apparatus according to an example of the present invention for transmitting using e.g. pre-compensated combined GSM-LTE signal generation.

The SC filter in FIG. 4 has a functionality for calculating the resulting distortion from the GSM to the LTE signal, taking the OFDM GI as well as CSI information of the radio channels into account. In case of a combined transmission from a single power amplifier and antenna location, common channel estimation may be applied. In case of two different locations for the GSM and LTE transmission, the CSI estimation of the GSM signal may be transferred to the LTE processing unit.

Figure 5:
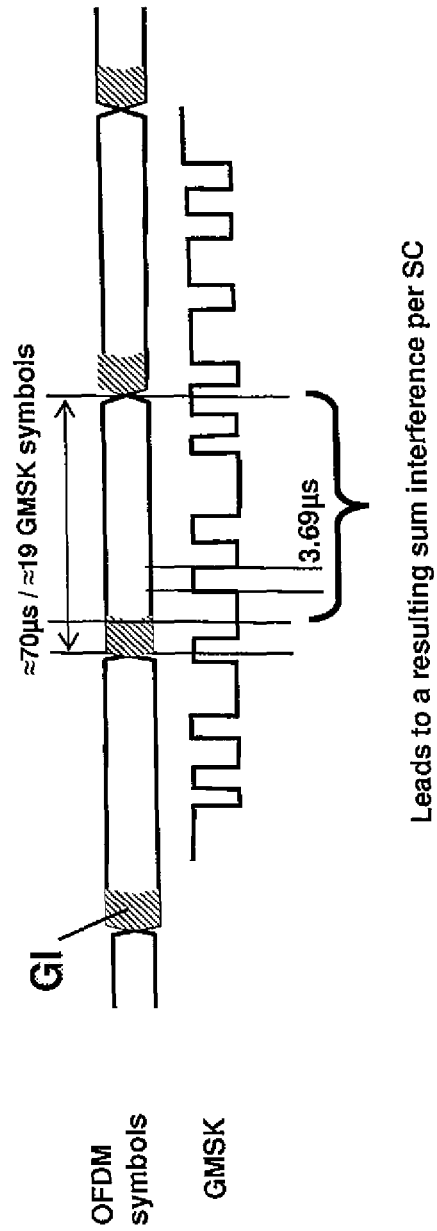
FIG. 5 shows resulting interference e.g. from GMSK (Gaussian minimum shift keying) to an LTE OFDM signal according to the apparatus shown in FIG. 4.

In FIG. 5, the LTE OFDM signal and the GMSK signal is drawn above each other. It can be seen that the symbol length of GMSK signals and the LTE OFDM signal have different length and that the OFDM signal has a GI, while GMSK has none. Due to shorter symbol length of the GMSK signal, there may result interference as a composition of several GMSK symbols. This may be quite severe and spread over the full frequency band as the length of the OFDM symbol is not a multiple of the GMSK symbol length.

In case that there is a frequency selective radio channel with different multipath components, the resulting GSM to LTE interference may be different, as the GMSK signal has no GI and has a shorter symbol length. For this reason, in case of frequency selective radio channels, the transmitter may be provided with full channel information for proper pre-distortion as explained above.

In the discussion of closed loop cooperative MIMO (multiple input multiple output), an extended feedback of CSI is considered which may be used for pre-distortion as well.

It is also possible to use the GSM frequency resources for LTE in case the GSM carrier is not allocated (gain per not transmitted TDMA frame in best case e.g. 5 ms, in worst case e.g. 4 ms).

3. Delay Reduction in Interference Cancellation for Receiver Solution to Combined GSM and LTE For the time domain approach in FIG. 6, the signal separation may be done at the receiver side. For this purpose, it is exploited that an interferer with a much larger Rx power than the desired signal may be easily detected and decoded and afterwards subtracted from the weaker signal. The reason is that the small user signal may not degrade detection of the strong signal significantly. For this reason, the receiver may have two branches. The upper one is for the demodulation of the GMSK signal as used for GSM. The demodulated and decoded signal is than used to generate a replica of the originally transmitted GSM signal including a copy of the low-pass filter (LPF). This signal is than subtracted from the receive signal in the lower LTE branch, thereby subtracting the GSM to LTE interference.

The FIFO (first in first out queue) in FIG. 6 may be included for compensation of the processing delay in the GSM branch. Afterwards, an FFT can be performed on the interference free Rx signal.

The GSM carrier bandwidth may be quite low with e.g. only 200 KHz so that it might be quite often frequency flat. Otherwise, the frequency selectivity of the radio channel may have to be replicated in the receiver as well before subtracting of the interfering GMSK signal, based on according channel estimation.

IF (interference) cancellation is proposed for two different systems. While GSM may have a frame length of 20 ms, for LTE Release 8, a very short sub frame length of 1 ms may reduce the latency on the radio air interface.

Optionally, the GSM signal may be channel decoded. As the LTE decoding may take place e.g. after cancellation of the GSM signal, the LTE signal may be delayed by the total processing duration of the GSM processing chain.

It is proposed to use CSI estimation for the GSM signal from the frames before, which will render an estimate.

The received signal $$\vec{Y} = \vec{X}_{LTE} \cdot \vec{H}_{LTE} + \vec{X}_{GSM} \cdot \vec{H}_{GSM}$$

can be represented by a Toeplitz matrix $\vec{Y}$ and is composed of a LTE signal part $\vec{X}_{LTE}$ an interfering GSM data part multiplied by the corresponding channel impulse responses for LTE signal part $\vec{h}_{LTE}$ and interferer $\vec{h}_{GSM}$. The received symbols are transformed by the IC algorithm, which can be expressed by a multiplication of the received data matrix $\vec{Y}$ by the filter weighting vector $\vec{a}$. This is resulting in $$\vec{Z} = \vec{Y} \cdot \vec{a} = \vec{X}_{LTE} \cdot \vec{H}_{LTE} \cdot \vec{a} + \vec{X}_{GSM} \cdot \vec{H}_{GSM} \cdot \vec{a}$$

The filter weighting vector $\vec{a}$ must fulfill the properties $$\vec{H}_{GSM} \cdot \vec{a} = 0; \ \vec{a} \neq 0; \ \vec{H}_{LTE} \cdot \vec{a} \neq 0$$

The filter weighting vector is estimated based on the CSI received in the last GSM burst periods, prior to the current LTE sub frame. Since LTE sub frame duration of 1 ms is not a multiple of GSM burst duration of 577 µs, the update of the IC filter configuration may happen asynchronous to the LTE sub frame periods. Averaging might be applied to get a more reliable CSI of the multiple user signals of the last burst durations.

In this way, the delay in the LTE processing chain may be limited to the processing duration of a FIR (finite impulse response) filter which might require a depth of approximately 4 GMSK symbol periods corresponding to approximately 16 µs.

4. Distributing via network planning different LTE Release 8 control channel configurations over the network in such a way that a significant part or even a complete GSM network can be embedded:

In an LTE Release 8 system with a very low number of users per cell, the PDCCH (physical downlink control channel) and the PHICH (physical hybrid automatic repeat request indicator channel) control channels are rather scarcely populated, such that empty Resource Element Groups or Physical Resource Blocks can be identified for embedding narrowband (GSM) carrier(s).

Using network planning to distribute different control channel configurations and optimizations over neighbor cells allows for creating sufficient options for embedding a significant part or a complete e.g. GSM network in a Reuse 1 LTE Release 8 network.

The example illustrated in FIG. 9A and FIG. 9B shows actual narrowband (GSM) embedding regions for a single configuration as well as potential narrowband (GSM) embedding regions due to other configurations e.g. for 10 MHz. The narrowband embedding region for a single 10 MHz configuration with medium number of scheduled users offers 2.6 MHz frequency spectrum. A 20 MHz carrier with a similar load and appropriately optimized may offer about a twice as large narrowband embedding region per configuration. By varying control channel configuration and optimization, the union set of narrowband embedding regions will offer sufficient spectrum for embedding a typical 2×2×2-Sites GSM network.

FURTHER EXAMPLES

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the transmitter and/or receiver, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. transmitter and/or receiver, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

For ease of clarity, the following table provides a survey of the abbreviations used in the above description. It is to be noted that an "s" following an abbreviation represents the plural of that abbreviation, e.g. "GIs" represents "guard intervals".

3GPP: 3rd generation partner ship project
LTE: Long term evolution
A&F: amplify and forward
BS: base station
CDD: cyclic delay diversity
CSI: channel state information
D&F: decode and forward
DL: downlink
FDD: frequency division duplexing
GI: guard interval
HARQ: hybrid automatic repeat request
LOS: line of sight
MS: mobile station
MCS: modulation and coding scheme
MIMO: multiple input multiple output
NB: Node B
OFDM: orthogonal frequency division multiplexing
OFDMA: orthogonal frequency division multiple access
R8: Release 8
RN: relay node
RS: reference signal
RB: resource block
SC: subcarrier
TDM: time domain multiplexing
UE: User equipment
UL: uplink

The invention claimed is:

1. A method, comprising:
    identifying, by a communication device, frequency resources for communicating, in a cell, a second carrier signal with a second bandwidth defined for a second radio access technology, in connection with varying, in at least one neighboring cell, control channel configurations in terms of frequency or carrier allocation, of a first carrier signal with a first bandwidth defined for a first radio access technology, and
    distributing, by the communication device, in a frequency spectrum or region of the first bandwidth unoccupied by control channel elements of the first carrier signal, at least a portion of the second carrier signal in accordance with the identification.

2. The method according to claim 1, wherein the first bandwidth and the second bandwidth are different.

3. The method according to claim 2, wherein the first bandwidth is greater than the second bandwidth.

4. The method according to claim 2, further comprising using resources within the second frequency band for the second carrier signal to communicate the first carrier signal in case the second carrier is not allocated.

5. The method according to claim 2, wherein the first bandwidth adjoins to or overlaps the second bandwidth.

6. The method according to claim 1, wherein the first carrier signal and the second carrier signal are communicated using different access technologies.

7. The method according to claim 6, wherein the first carrier signal is a long term evolution carrier signal, and the second carrier signal is a global system for mobile communications carrier signal.

8. The method according to claim 1, wherein the first carrier signal and the second carrier signal are transmitted from a single means or from multiple different means, respectively, for transmitting.

9. The method according to claim 8, wherein the first carrier signal and the second carrier signal are transmitted from multiple different means, respectively, for transmitting in a coordinated manner.

10. An apparatus, comprising:
    at least one processor; and
    at least one memory including computer program code, where the at least one memory and the computer program code are configured, with the at least one processor, to cause the apparatus to at least:
    identify frequency resources for communicating, in a cell, a second carrier signal with a second bandwidth defined for a second radio access technology, in connection with varying, in at least one neighboring cell, control channel configurations in terms of frequency or carrier allocation, of a first carrier signal with a first bandwidth; and
    distribute, in a frequency spectrum or region of the first bandwidth unoccupied by control channel resource elements of the first carrier signal, at least a portion of the second carrier signal in accordance with the identification.

11. The apparatus according to claim 10, wherein the first bandwidth and the second bandwidth are different.

12. The apparatus according to claim 11, wherein the first bandwidth is greater than the second bandwidth.

13. The apparatus according to claim 11, wherein the at least one memory including the computer program code is configured with the at least one processor to cause the apparatus to use resources within the second frequency band for the second carrier signal to communicate the first carrier signal in case the second carrier is not allocated.

14. The apparatus according to claim 11, wherein the first bandwidth adjoins to or overlaps the second bandwidth.

15. The apparatus according to claim 10, wherein the first carrier signal and the second carrier signal are communicated using different access technologies.

16. The apparatus according to claim 15, wherein the first carrier signal is a long term evolution carrier signal, and the second carrier signal is a global system for mobile communications carrier signal.

17. The apparatus according to claim 10, wherein the first carrier signal and the second carrier signal are transmitted from a single means or from multiple different means, respectively, for transmitting.

18. The apparatus according to claim 17, wherein the first carrier signal and the second carrier signal are transmitted from multiple different means, respectively, for transmitting in a coordinated manner.

19. Base station or user equipment comprising an apparatus according to claim 10.

20. A non-transitory computer readable medium embodying a computer program product, the computer program product executed by at least one processor to perform method steps of an apparatus according to claim 10.

* * * * *